United States Patent
Sun et al.

(10) Patent No.: US 12,401,592 B2
(45) Date of Patent: Aug. 26, 2025

(54) FLEXIBLE LOAD BALANCING ON MULTIPATH NETWORKS

(71) Applicant: Lemon Inc., Grand Cayman (KY)

(72) Inventors: Yan Sun, Los Angeles, CA (US); Hang Zhu, Los Angeles, CA (US); Lishan Li, Los Angeles, CA (US); Jianxi Ye, Los Angeles, CA (US); Huan Sun, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 181 days.

(21) Appl. No.: 18/295,783

(22) Filed: Apr. 4, 2023

(65) Prior Publication Data

US 2023/0246966 A1 Aug. 3, 2023

(51) Int. Cl.
*H04L 47/125* (2022.01)
*H04L 45/24* (2022.01)
*H04L 47/50* (2022.01)

(52) U.S. Cl.
CPC ............ *H04L 47/125* (2013.01); *H04L 45/24* (2013.01); *H04L 47/58* (2013.01)

(58) Field of Classification Search
CPC ..... H04L 47/125; H04L 45/24; H04L 47/193; H04L 47/58
See application file for complete search history.

(56) References Cited

U.S. PATENT DOCUMENTS

| | | | |
|---|---|---|---|
| 2008/0144504 A1* | 6/2008 | Marcondes | H04L 47/125 370/252 |
| 2017/0366445 A1* | 12/2017 | Nemirovsky | H04L 45/12 |
| 2020/0396635 A1* | 12/2020 | Seenappa | H04W 28/0831 |
| 2024/0256347 A1* | 8/2024 | Toal | G06F 9/5072 |

FOREIGN PATENT DOCUMENTS

| | | | | |
|---|---|---|---|---|
| CN | 103229460 A | * | 7/2013 | ............ H04L 47/19 |
| CN | 116017578 A | * | 4/2023 | |
| EP | 3522479 A1 | * | 8/2019 | ............ H04L 45/24 |

(Continued)

OTHER PUBLICATIONS

Bonaventure, O. et al., "Multipath TCP Deployments," IETF Journal, Nov. 1, 2016, 13 pages.

(Continued)

*Primary Examiner* — David R Lazaro
*Assistant Examiner* — Mariegeorges A Henry
(74) *Attorney, Agent, or Firm* — Alleman Hall & Tuttle LLP

(57) ABSTRACT

A computer system for flexible load balancing on a multipath network includes a processor that implements a multipath transport protocol as a transport layer of a network stack, a load balancer that distributes network traffic across a plurality of paths, and a congestion controller in communication with the load balancer. The congestion controller determines parameters for a message based on information received from the load balancer. A scheduler included in the load balancer selects a load balancing algorithm from a plurality of load balancing algorithms based on the parameters of the message received from the congestion controller and, based on the selected load balancing algorithm, determines a timing and a path for the message to be sent to the transport layer.

18 Claims, 8 Drawing Sheets

(56) References Cited

FOREIGN PATENT DOCUMENTS

| KR | 101344153 B1 | * | 12/2013 | |
| WO | WO-2011101425 A1 | * | 8/2011 | ............. H04L 45/24 |

OTHER PUBLICATIONS

Brakmo, L. et al., "TCP Vegas: New Techniques for Congestion Detection and Avoidance," Proceedings of the 1994 Conference on Communications Architectures, Protocols and Applications (SIGCOMM 1994), Aug. 31, 1994, London, United Kingdom, 12 pages.

Cardwell, N. et al., "BBR: Congestion-Based Congestion Control: Measuring Bottleneck Bandwidth and Round-Trip Propagation Time," ACM Queue, vol. 14, No. 5, Oct. 1, 2016, 34 pages.

Ha, S. et al., "CUBIC: A New TCP-Friendly High-Speed TCP Variant," ACM SIGOPS Operating Systems Review, vol. 42, No. 5, Jul. 1, 2008, 11 pages.

Han, H. et al., "Overlay TCP for Multi-Path Routing and Congestion Control," IEEE/ACM Transactions on Networking, vol. 14, No. 6, Dec. 1, 2006, 24 pages.

Honda, M. et al., "Multipath Congestion Control for Shared Bottleneck," Proceedings of the 7th International Workshop on Protocols for Fast, Long-Distance Networks (PFLDNeT 2009), May 21, 2009, Tokyo, Japan, 6 pages.

Iyengar, J. et al., "Concurrent Multipath Transfer Using SCTP Multihoming Over Independent End-to-End Paths," IEEE/ACM Transactions on Networking, vol. 14, No. 5, Oct. 1, 2006, 14 pages.

Kelly, F. et al., "Stability of End-to-End Algorithms for Joint Routing and Rate Control," ACM SIGCOMM Computer Communication Review, vol. 35, No. 2, Apr. 1, 2005, 8 pages.

Khalili, R. et al., "MPTCP is not Pareto-Optimal: Performance Issues and a Possible Solution," IEEE/ACM Transactions on Networking, vol. 21, No. 5, Aug. 21, 2013, 16 pages.

Raiciu, C. et al., "Coupled Congestion Control for Multipath Transport Protocols," Internet Engineering Task Force RFC 6356, Oct. 1, 2011, 12 pages.

Wei, D. et al., "FAST TCP: Motivation, Architecture, Algorithms, Performance," IEEE/ACM Transactions on Networking, vol. 14, No. 6, Dec. 1, 2006, 14 pages.

Wischik, D. et al., "Design, implementation and evaluation of congestion control for multipath TCP," Proceedings of the 8th USENIX Symposium on Networked Systems Design and Implementation (NSDI '11), Mar. 30, 2011, Boston, MA, 14 pages.

European Patent Office, Extended European Search Report Issued in Application No. 24167080.1, May 27, 2024, Germany, 9 pages.

European Patent Office, Communication pursuant to Rules 70(2) and 70a(2) EPC and reference to Rule 39(1) EPC for European Application No. 24167080.1, mailed Oct. 14, 2024, 2 pages.

* cited by examiner

FLEXIBLE LOAD BALANCING ON MULTIPATH NETWORKS

BACKGROUND

Multipath transport protocols enable multiple network paths to be used to send data for a single connection, thereby increasing throughput and bandwidth availability. Network traffic is distributed across the multiple network paths by load balancers, which enhances capacity and reliability of applications. Congestion controllers prevent or remove congestion along the paths by limiting the amount of data that can be sent at one time. However, as discussed below, opportunities remain for improvements in load balancing on multipath networks, particularly with respect to cooperation between load balancers and congestions controllers.

SUMMARY

In view of these issues, computing systems and methods for flexible load balancing on a multipath network are provided. In one aspect, the computing system includes a processor, a load balancer, and a congestion controller. The processor implements a multipath transport protocol as a transport layer on top of a user datagram protocol layer of a network stack. The load balancer includes a scheduler and is configured to distribute network traffic across a plurality of paths. The congestion controller is in communication with the load balancer and is configured to determine parameters for a message based on information received from the load balancer. The scheduler selects a load balancing algorithm from a plurality of load balancing algorithms based on the parameters of the message received from the congestion controller and, based on the selected load balancing algorithm, determines a timing and a path for the message to be sent to the transport layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Multipath transport protocol uses multiple network paths for a single connection. A benefit of this configuration is that bandwidth can be combined or "pooled" to yield high throughput and high availability time, as packets from a single message can be sent over several paths at the same time. In conventional multipath systems, a scheduler will send messages and/or packets on the path with the shortest, smoothest round trip time. However, the path with the shortest round trip time may have a higher packet loss rate than a path with a longer round trip time. For messages that prioritize a high rate of accuracy over a shortest time, the packet loss rate of the path with a shortest round trip time may be unacceptable. Additionally, the packets of a message may be sent equally across multiple paths, regardless of the message parameters. When a packet is lost or times out, the original path may be heavily congested or have a broken link, thereby requiring that the packet be re-sent on a different path, which may result in a longer message completion time, i.e., lag.

Figure 1:
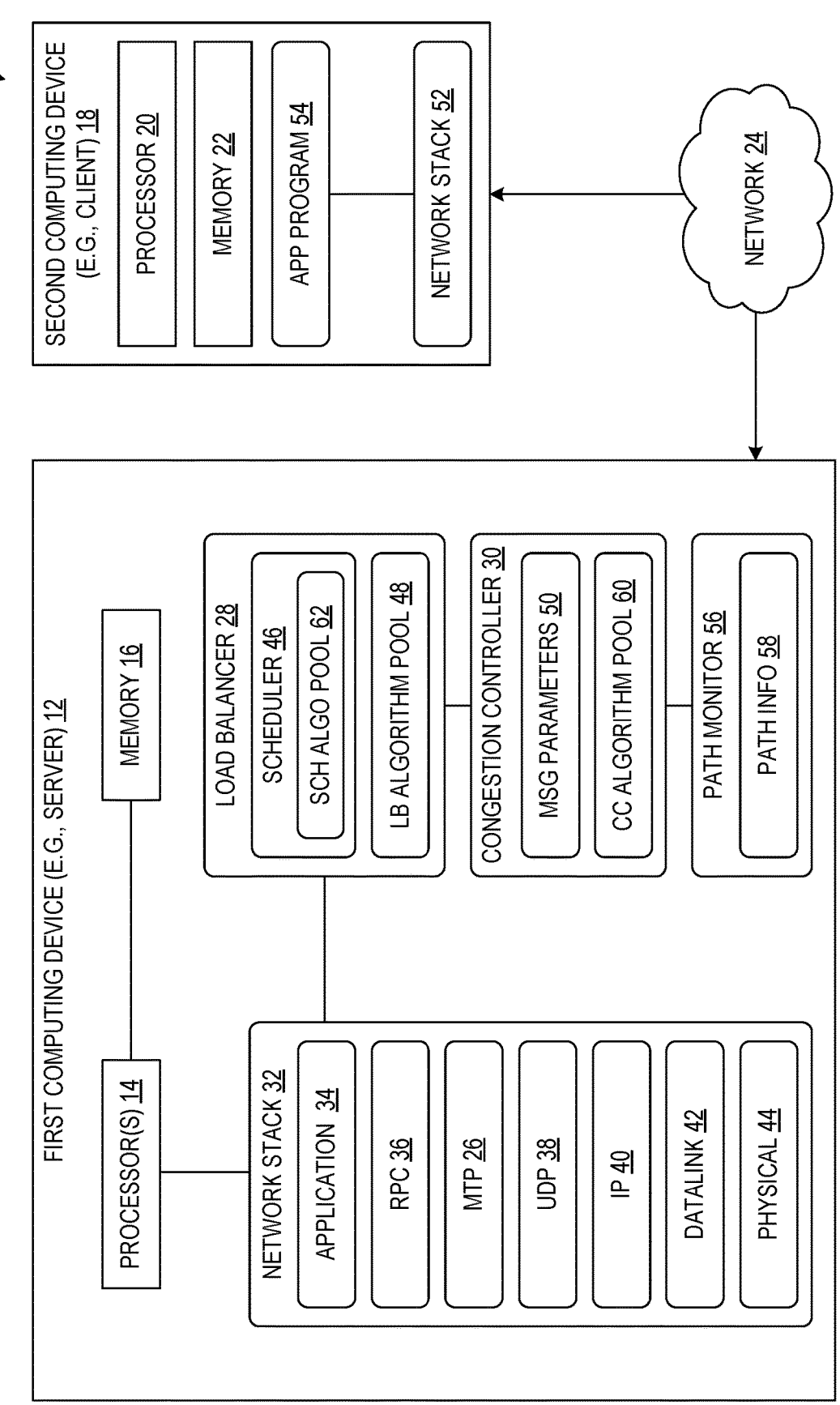
FIG. 1 shows a schematic view of computing system for flexible load balancing on a multipath network, according to one embodiment of the present disclosure.

As schematically illustrated in FIG. 1, to address the above identified issues, a computing system 10 for flexible load balancing on a multipath network is provided. The computing system 10 is illustrated as comprising a first computing device 12 including one or more processors 14 and memory 16, and a second computing device 18 including one or more processors 20 and memory 22, with the first and second computing devices 12, 18 being in communication with one another via a network 24. The illustrated implementation is exemplary in nature, and other configurations are possible. In the description of FIG. 1 below, the first computing device will be described as a server computing device 12 and the second computing device will be described as a client computing device 18, and respective functions carried out at each device will be described. It will be appreciated that in other configurations, the first computing device could be a computing device other than server computing device 12. In some configurations, the computing system 10 may include a single computing device that carries out the salient functions of both the server computing device 12 and test computing device 18. In other alternative configurations, functions described as being carried out at the client computing device 18 may alternatively be carried out at the server computing device 12 and vice versa.

Continuing with FIG. 1, the server computing device 12 may, for example, take the form of an automated server hosted at an application data center, for example. Alternatively, the server computing device 12 may be configured to be hosted at a client-specified data center under control of the client, for performance, security, privacy, and/or export compliance reasons, for example. As discussed above, the server computing device 12 includes one or more processors 12 and associated memory 14. The one or more processors 12 are configured to execute instructions using portions of the associated memory 14 to implement a multipath transport protocol (MTP) 26, a load balancer 28, and a congestion controller 30. The MTP 26 is implemented as a transport layer in a network stack 32. The network stack 32 may further include an application layer 34, a remote procedure call (RPC) layer 36, a user datagram protocol (UDP) layer 38, an internet protocol (IP) layer 40, a datalink layer 42, and a physical layer 44.

As illustrated in FIG. 1, the MTP 26 is implemented on top of the UDP layer 38 of the network stack 32. The MTP 26 allows messages and/or packets to be sent simultaneously across a plurality of paths P of a multipath network between a sender and a receiver, i.e., the server computing device 12 and the client computing device 18.

Figure 2:
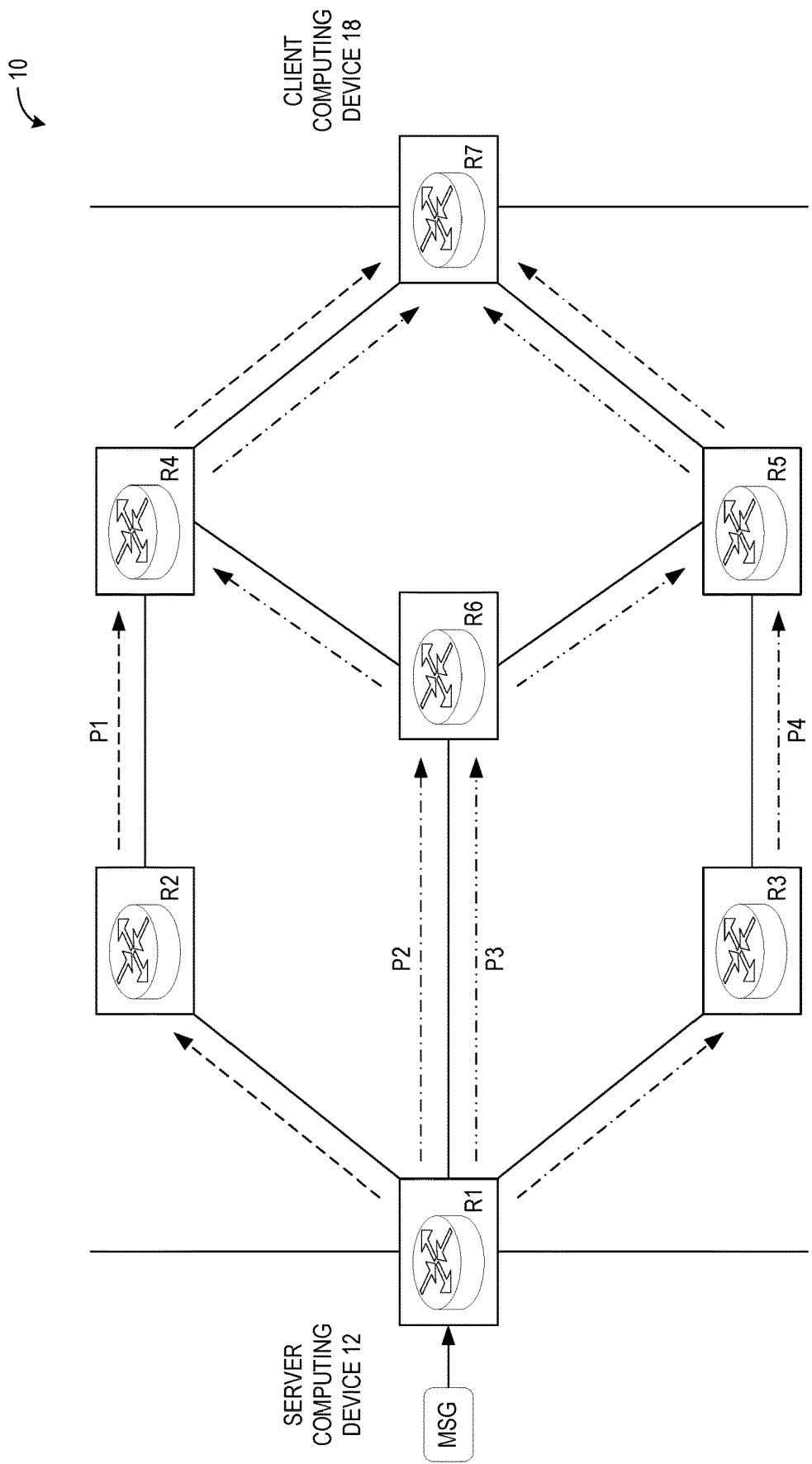
FIG. 2 shows an example of multipath forwarding implemented by the computing system of FIG. 1.

Turning briefly to FIG. 2, an example of a multipath network between the server computing device 12 and client computing device 18 of the computing system 10 is shown. As illustrated, there are multiple network paths P for a single connection. When receive side scaling (RSS), i.e., multi-queue receive, is enabled on a network interface controller (NIC), network receive processing is distributed across multiple receive queues, which allows inbound traffic to be processed by multiple devices. RSS selects a receive queue for each packet based on its heading to spread the traffic evenly across queues, and routing protocols at each router then split the flow of packets across multiple paths.

As such, in the illustrated example, packets of a message MSG are sent from the server computing device 12 via a first router R1 along a first path P1 (dashed line), a second path P2 (dash dot line), a third path P3 (dash dot dot line), and/or a fourth path P4 (dash dash dot line) to a seventh router R7 at the client computing device 18. P1 passes through the second and fourth routers R2, R4; P2 passes through the sixth and fourth routers R6, R4; P3 passes through the sixth and fifth routers R6, R5, and P4 passes through the third and fifth routers 3R, 5R. This approach enables high throughput and increased availability time. While the illustrated example shows four paths and seven routers, it will be appreciated that the multipath forwarding network may include any suitable number of paths and routers.

Returning to FIG. 1, the UDP layer 38 offers a best-effort message delivery service, but lacks any flow, congestion, or error control. The load balancer 28 is configured to distribute network traffic across the plurality of paths, and the congestion controller 30 controls the entry of messages and/or packets into the network to avoid congestion collapse. As described in detail herein, the load balancer 28 and the congestion controller 30 exchange information to determine a path or paths for a message and/or packets to be sent to the transport layer of the network stack 32.

The load balancer 28 includes a scheduler 46 and a load balancer algorithm pool 48 comprising a plurality of load balancing algorithms. As described in detail below with respect to FIG. 3, the scheduler 46 receives information about a message, such as priority, packet loss awareness, size, accuracy requirements, and the like, for example, and sends the message information to the congestion controller 30. Based on the information received from the scheduler 46, the congestion controller 30 determines parameters 50 for the message and returns the message parameters 50 to the scheduler 46. The scheduler 46 then selects a load balancing algorithm from the load balancing algorithm pool 48 based on the message parameters 50. Based on the selected load balancing algorithm, the scheduler 46 determines a timing and a path for the message to be sent to the transport layer. The message is then sent from the server computing device 12 to a network stack 52 of the client computing device 18, where it interacts with an application program 54.

As shown in FIG. 1 and described in detail below with reference to FIG. 3, the server computing device 12 further includes a path monitor 56 that receives path information 58 for each path P in the multipath network. The path monitor 52 is further configured to select a congestion control algorithm for each path P from a congestion control algorithm pool 60 comprising a plurality of congestion control algorithms based on the path information 58. The selected congestion control algorithms determine a path status for each respective path P based on the path information 58. Also as shown in FIG. 1 and described in detail below, the scheduler 46 is configured to select a scheduling algorithm from a scheduling algorithm pool 62 comprising a plurality of scheduler algorithms based on a property of the message.

Figure 3:
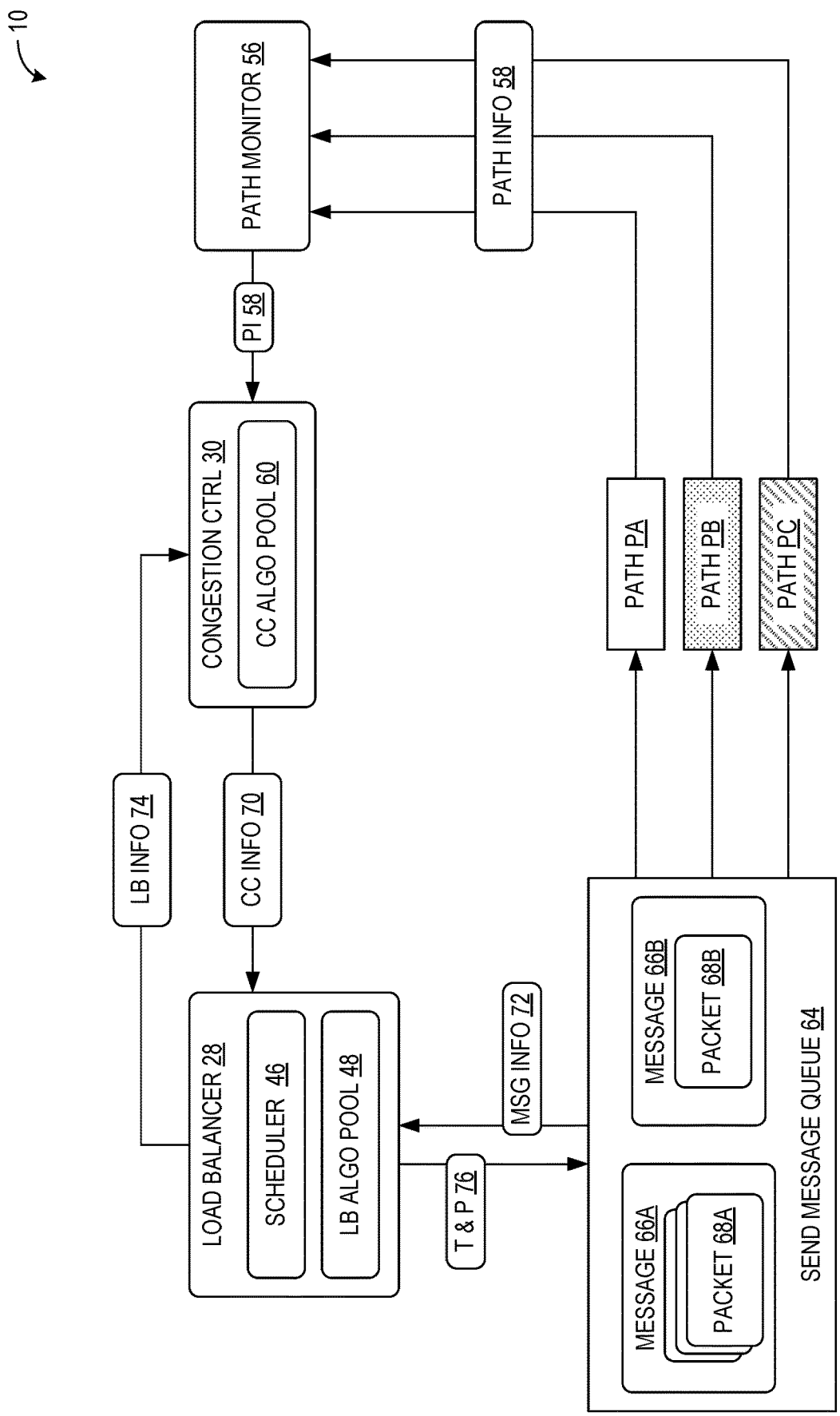
FIG. 3 shows a schematic view of communication between a load balancer and a congestion controller for each path of the computing system of FIG. 1.

FIG. 3 shows a schematic view of communication between the load balancer 28 and the congestion controller 30 for each path P of the computing system 10. As illustrated, a message queue 64 includes messages 66A, 66B, each of which have a respective one or more packets 68A, 68B, and there are three paths PA, PB, PC by which the messages 66A, 66B and packets 68A, 68B can be sent. The path monitor 58 receives path information 58 for each path PA, PB, PC, such as a number of in-flight messages, a total remaining size of messaged waiting to be transferred, an average round trip time, a most recent round trip time, a shortest round trip time, an average sending rate without congestion, a most recent sending rate without congestion, a congestion notification, and a packet loss rate, for example. While the illustrated example includes one path monitor for all paths, it will be appreciated that each path may have an individual path monitor.

Based on the path information 58, the path monitor 56 selects a congestion control algorithm for each path PA, PB, PC from the congestion control algorithm pool 60 of the congestion controller 30. The selected congestion control algorithms determine a status of each path PA, PB, PC based on the path information 58. The congestion controller 30 sends congestion control information 70 for the status of each path, including the sending rate and congestion window, to the scheduler 46. The scheduler 46 then selects a load balancing algorithm from the load balancing algorithm pool 48, which determines if a message will be sent to the transport layer, and when the message is sent.

As discussed above, the scheduler 46 also receives message information 72 about the messages 68A, 68B, such as priority, packet loss awareness, size, accuracy requirements, and the like. This information is sent from the load balancer 28 to the congestion controller 30 as load balancing (LB) information 74, which may determine whether one or more of the selected congestion control algorithms and/or congestion control parameters needs to be changed, based on the message information 72. The scheduler 46 then determines a timing T and path P (T & P) 76 for each message and/or packet. As such, the communication between the load balancer 28 and the congestion controller 30 is a closed loop with positive feedback from the load balancer 28 to the congestion controller 30.

Figure 4:
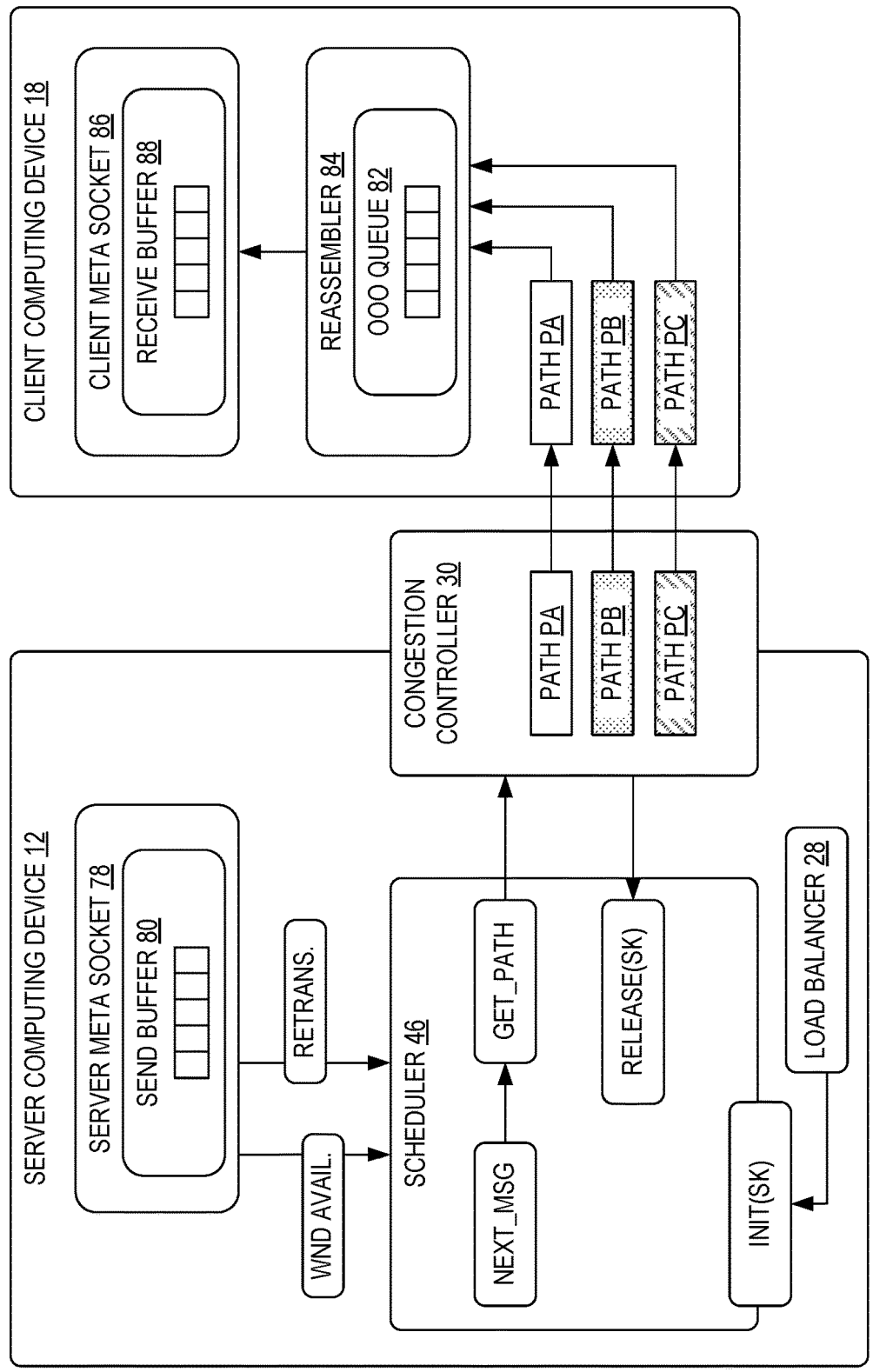
FIG. 4 shows an example framework for a scheduler and the congestion controller between a sender and receiver for the computing system of FIG. 1.

FIG. 4 shows an example framework for the scheduler 46 and the congestion controller 30 between the server computing device 12 and the client computing device 18. As illustrated, the server computing device 12 has a server meta socket 78 that includes a send buffer 80, i.e. a queue of messages to be sent. Upon processing a "next_message" command, the scheduler 46 is configured to receive one or more messages from the send buffer 80 and determine a path P or paths by which it is to be sent. The messages may be sent to the scheduler 46 based on window availability, or as a retransmission when the message fails to reach the network stack 52 of the client computing device 18.

A "get_path" command is then processed at the scheduler 46 to return a path P for the message. The message is sent to the client computing device 18 on the determined path P via the congestion controller 30. As described below with reference to FIGS. 6A and 6B, one or more messages may be sent on multiple paths P and, consequently, arrive in a different order than that in which it was sent, forming an out of order (OOO) queue 82. A reassembler 84 rearranges the messages in the OOO queue 82 to restore the sent order and transmits them to a client meta socket 86 as a receive buffer 88.

When one or more additional paths P are required, the load balancer 28 may send an "init(sk)" command to the scheduler 46 to call for a new path P. Similarly, when a path P is no longer needed, the congestion controller 30 may send a "release(sk)" command to the scheduler 46 to close the unneeded path P.

Figure 5:
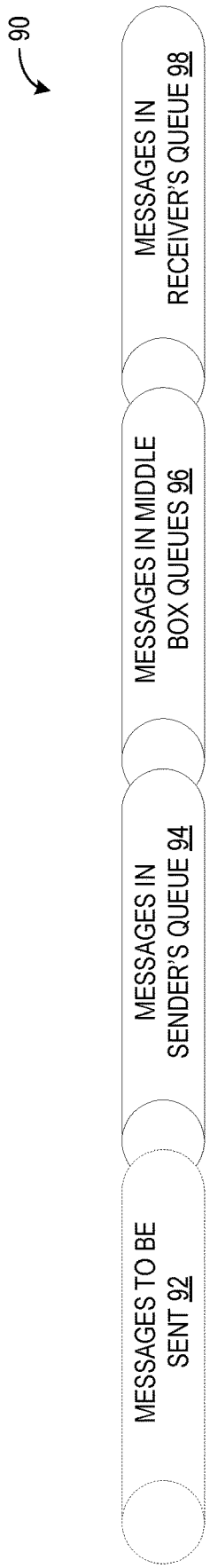
FIG. 5 shows a queue model for packets on a path of the computing system of FIG. 1.

A queue model 90 for messages on a path P from the server computing device 12 to the client computing device 18 is shown in FIG. 5. Messages to be sent 92 are waiting to enter the path, as indicated by the dashed line, while messages in the sender's queue 94, middle box queues 96, and receiver's queue 98 together determine the sending queue length. The current queue length $q_i$ along the path can be estimated as shown below in Equation 1.

$$q_i = \frac{cwnd_i}{RTT_i}(RTT_i - RTT_{i\_min}) + \text{sending\_queue\_length}_i \quad (1)$$

where $cwnd_i$ is the congestion window for the ith path, $RTT_i$ is the round trip time (RTT) for the ith path, $RTT_{i\_min}$ is the minimum RTT for the ith path, as determined by the messages in the middle box queues 96 and the messages in the receiver's queue 98, and the sending queue length is determined by the sum of the messages in the sender's queue 94, middle box queues 96, and receiver's queue 98.

As described above, the scheduler selects a load balancing algorithm from the load balancer algorithm pool 48 that comprises a plurality of load balancing algorithms. The plurality of load balancing algorithms includes an earliest completion first algorithm, a delayed decision making algorithm, and a most stable path algorithm.

The earliest completion first algorithm is selected when the message information 72 indicates that the path along which the message can complete data transfer most efficiently is desired. This algorithm is based on message size and the smoothed sending rate, as shown below in Equation 2.

$$C_i = \frac{\text{new\_message\_size} + q_i}{\text{Rate\_smooth}_i} \quad (2)$$

where $C_i$ is the time to complete the data transmission if the ith path is selected and the Rate_smooth is the smoothed sending rate. When a message size is small, it is more likely to be assigned to a path with a small total remaining messages size and a small RTT. In contrast, a large message is more likely to be assigned to a path with a large latest sending rate.

If all paths are full and cannot accept more messages, a delayed decision making algorithm may be selected. The time to complete the data transmission for the message on the ith path may be estimated as shown below in Equation 3.

$$C_i = \frac{q_i}{\text{Rate\_smooth}_i} \quad (3)$$

When network conditions suddenly change and/or when the application receiving buffer is small, the scheduler 46 can cancel the transmission of low-importance messages to prioritize the transport of priority messages. It will be appreciated that the whole message is considered, rather than a single packet, and the message completion time includes the time required to transfer files and frames for the application.

When packet loss awareness and accuracy are important, a most stable path algorithm may be selected. The most stable path may be determined based on RTT stability, as shown below in Equation 4.

$$RTT\_V_i = \frac{\sum_{i=0}^{n-1}(RTT_i - RTT_{smooth})^2}{n-1} \quad (4)$$

where Vi is the variance of the ith path.

Additionally or alternatively, the most stable path may be determined based on sending rate stability, as shown below in Equation 5.

$$Rate\_V_i = \frac{\sum_{i=0}^{n-1}(Rate_i - Rate_{smooth})^2}{n-1} \quad (5)$$

In addition to the above LB algorithms, scheduling algorithms may also be used for flexible load balancing for a multipath network. These algorithms may be selected from the scheduling algorithm pool 62 based on a property of the message.

When priority is not a factor, a round robin scheduling algorithm may be used. An algorithm for a weighted round robin may be based on the smoothed sending rate, as shown below in Equation 6.

$$W_i = \text{Rate\_smooth}_i \quad (6)$$

where Wi is the weight of the ith path and is equal to a value of the smoothed sending rate of the ith path. Additionally or alternatively, an algorithm for a weighted round robin may be based on the space left in the congestion window, as shown below in Equation 7.

$$W_i = \text{CNDW\_left}_i \quad (7)$$

where Wi is the weight of the ith path and is equal to a value of the space left in the congestion window of the ith path (CNDW_lefti).

Other scheduling algorithms may be used to select a path with the minimum total size or number of packets in the queue, a path with the least amount of packet loss in a recent number of round trips, a path with the minimum latest RTT, and/or a path with the minimum smoothed RTT, for example.

As discussed above, the path monitor 52 selects a congestion control algorithm for each path P from the congestion control algorithm pool 60 based on the path information 58. The path information may include a number of in-flight messages, a total remaining size of messaged waiting to be transferred, an average round trip time, a most recent round trip time, a shortest round trip time, an average sending rate without congestion, a most recent sending rate without congestion, a congestion notification, and a packet loss rate, for example.

An average RTT for a path may be determined based on the smoothed RTT of the path over a period of time, as shown below in Equation 8.

$$\text{RTT\_smooth} := \alpha \times \text{RTT\_latest} + (1-\alpha) \times \text{RTT\_smooth} \quad (8)$$

where RTT_latest is the most recently tested RTT and $0<\alpha<1$, and is used to adjust the history impaction. When $\alpha=1$, only the RTT_latest is considered.

Similarly, the average sending rate on a path may be determined based on the smoothed sending rate of the path without congestion, as shown below in Equation 9.

$$\text{SendRate\_smooth} := \alpha \times \text{SendRate\_latest} + (1-\alpha) \times \text{SendRate\_smooth} \quad (9)$$

where SendRate_smooth is the average sending rate, which indicates potential bandwidth, and SendRate_latest is the most recent sending rate on the path without congestion.

End-to end queue length samples can be used to detect congestion. The current queue length can be estimated as shown below in Equation 10.

$$q = \frac{w}{RTT}(RTT - RTT_{min}) \quad (10)$$

where w is the size of the congestion control window, RTT is the sampled RTT time, and $RTT_{min}$ is the minimum observed RTT, which is used as an estimate of network propagation delay.

When an acknowledgement (ACK) is transmitted to the server computing device 12 to indicate that all packets of a message were received at the client computing device 18, the current network queue length q of a path can be estimated as described above with reference to Equation 1 and compared to a threshold T queue length. ACKs for packets that were transmitted over a path with a current queue length q greater than the threshold T queue length are tagged with a congestion marker. When all packets from a same window are acknowledged, the congestion can be calculated, as shown below in Equation 11.

$$F := \frac{(\# \text{ of } ACKs \text{ with } q > T) + \# \text{ of } ECN}{\text{total } \# \text{ of } ACKs \text{ in a window}} \quad (11)$$

where F is the percentage of paths that are congested, and ECN is an explicit congestion notification. An exponential moving average (EMA) filter can then be applied to determine the network congestion level, as shown below in Equation 12.

$$C := \alpha \times F + (1-\alpha) \times C \quad (12)$$

where C is the network congestion level and $0<\alpha<1$, and is used to adjust the history impaction. When $\alpha=1$, only the current congestion level is considered.

The congestion window for a path can be updated for each RTT according to the network congestion level indicated by C, as shown below in Equation 13.

$$\omega_i := \begin{cases} \omega_i - \omega_i \times \frac{C}{2}, & \text{if } F > 0, \\ \omega_i + \frac{1}{\omega_i}, & \text{if } F = 0 \\ \frac{\omega_i}{2}, & \text{if packet loss} \end{cases} \quad (13)$$

where $\omega_i$ is the congestion level for the ith path.

Thus, when network congestion is at a low level, the window is reduced by a small value; otherwise, the window is reduced significantly to alleviate high network congestion.

Figure 6A:
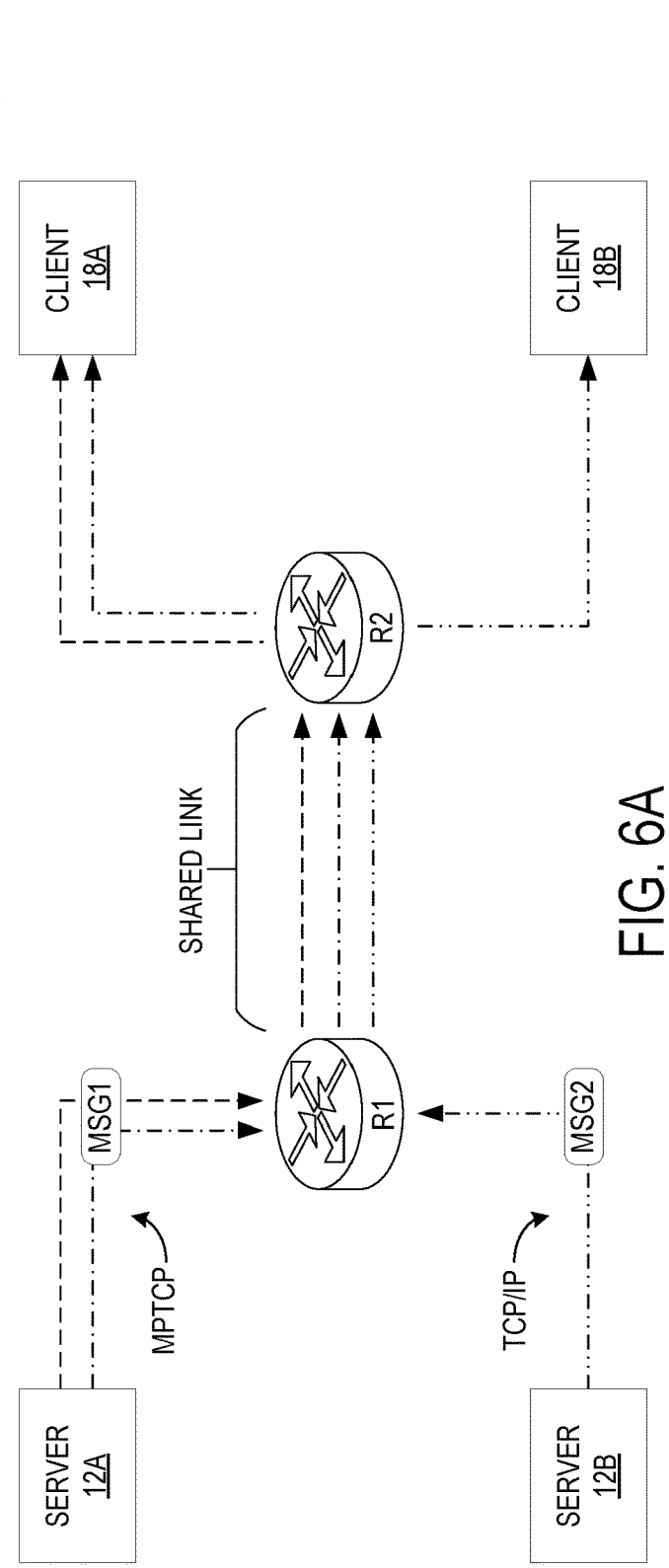
FIGS. 6A-6C show examples of load balancing across shared paths for the computing system of FIG. 1.

FIG. 6A shows an example of a shared link for messages sent according to different transport protocols. In the illustrated example, a first server computing device 12A is sending a first message MSG1 to a first client computing device 18A via MTP, as indicated by the dashed and dash dot lines. A second server computing device 12B is sending a second message MSG2 to a second client computing device 18B via TCP, as indicated by the dash dot dot line. The messages MSG1, MSG2 are routed through a first router R1 and a second router R2 before being delivered to the respective client computing devices 18A, 18B. As indicated, the connection between the routers R1, R2 is a shared link. When a multipath connection shares a link with a single path connection, such as TCP, the TCP connection may be starved if the bandwidth is not shared fairly.

To address this, when the server computer device 12 implementing a multipath transport protocol receives an ACK, the congestion controller 30 is configured to increase the congestion window size by 1/n, with n being the number of paths. When the number of paths is large, the small congestion window of each path leads to an increased probability of timing out, increased latency, an increased possibility of OOO, high hardware resource usage, and throughput degradation. The number of paths is dynamically decided by these parameters. Each connection has a priority value, with the default value being 1. Each new connection registers its priority value, and the sum of priority value is recorded. The congestion controller 30 receives resource usage and the priority sum and configures the optimal number of path, as shown below in Equation 14.

$$\text{optimal\_PathNum}_i := \alpha \times \frac{\text{priority}}{\text{total\_priority}} \times \text{total\_resource} \quad (14)$$

where the default value of a is 0.8. The negotiated path number must meet the requirements of both endpoints, i.e., client computing devices 18A, 18B. This is determined as shown below in Equation 15.

$$\text{negotiated\_PathNum}_i := \min\{\text{optimal\_PathNum}_i, \text{optimal\_PathNum}_i'\} \quad (15)$$

Updates to the resource usage are periodically sent to the congestion controller 30, which adjusts the number of paths in its connection as needed.

Figure 6B:
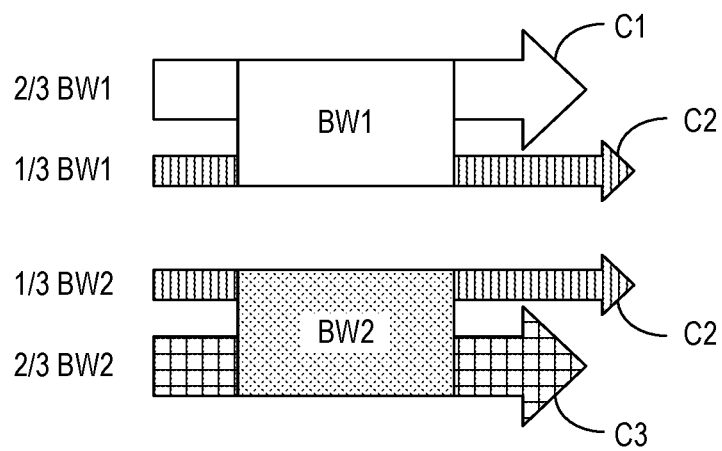
Figure 6C:
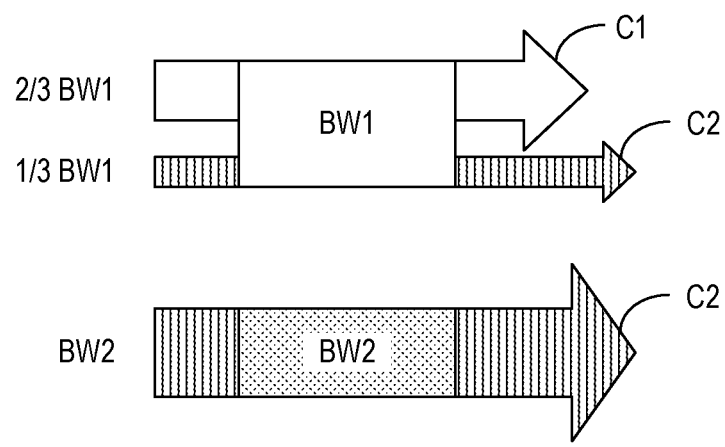

FIGS. 6B and 6C show examples of fairness between connections C. As illustrated in FIG. 6B, a connection C1 requires ⅔ of a first bandwidth BW1. The remaining ⅓ BW1 is allocated to a first portion of a second connection C2. The second portion of the second connection C2 uses ⅓ of a second bandwidth BW2, and the remaining ⅔ BW2 is allocated to a third connection C3. FIG. 6C shows two connections C1, C2 distributed over two bandwidths BW1, BW2. The first connection C1 requires ⅔ BW2. The second connection C2 requires more BW than is than the available BW2, so a first portion of the second connection C2 uses all of BW2, and the remaining second portion of the second connection C2 uses the ⅓ BW1 that is not used by the first connection C1.

Figure 7:
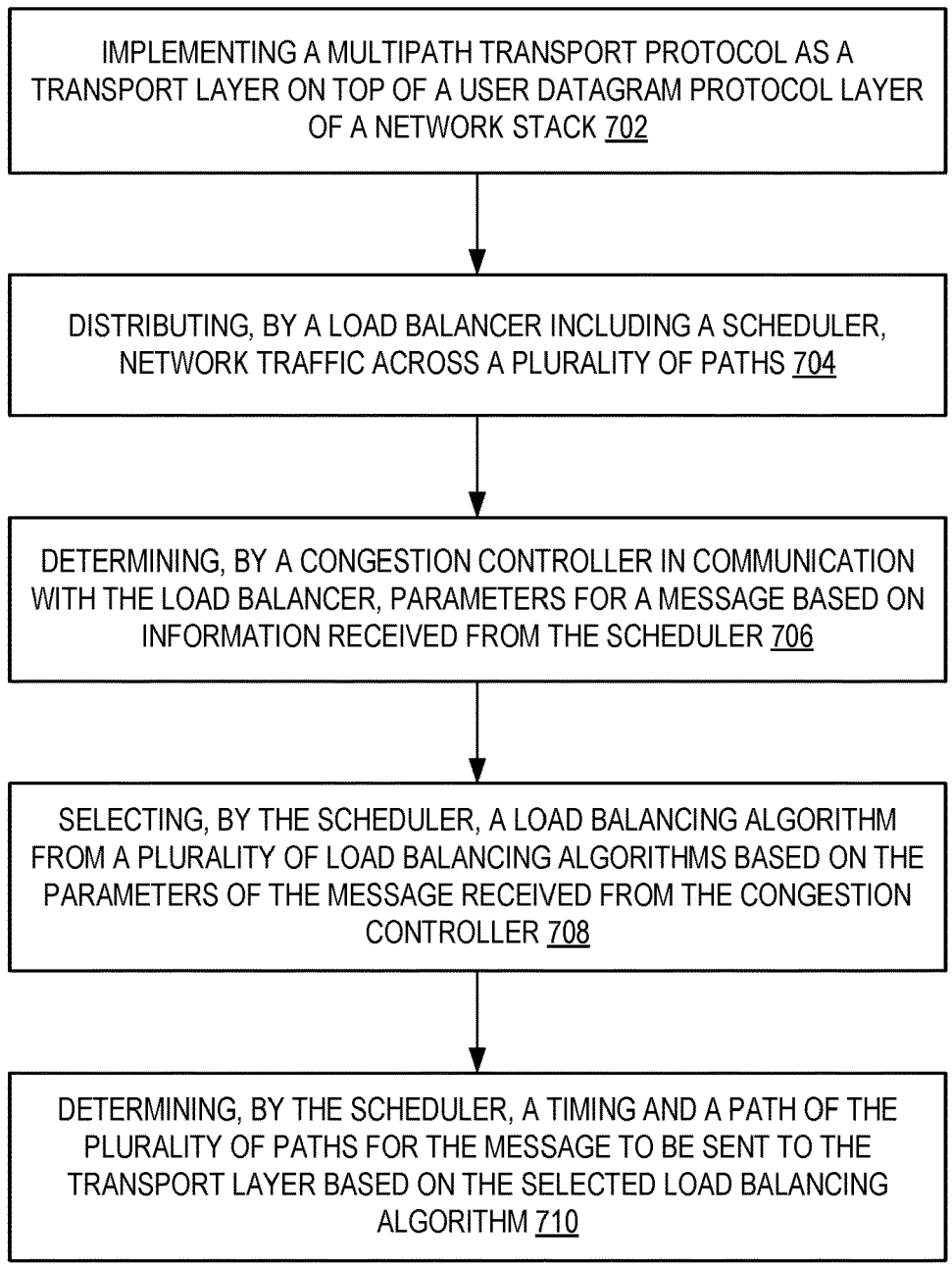
FIG. 7 shows a flow diagram of a method for flexible load balancing on a multipath network, which may be implemented by the computing system of FIG. 1 or other suitable hardware and software.

FIG. 7 shows a flowchart for a method 700 for flexible load balancing on a multipath network. Method 700 may be implemented by the hardware and software of computing system 10 described above, or by other suitable hardware and software. At step 702, the method 700 may include implementing a multipath transport protocol as a transport layer on top of a user datagram protocol layer of a network stack. Proceeding from step 702 to step 704, the method 700 may further include distributing, by a load balancer including a scheduler, network traffic across a plurality of paths. Distributing network traffic avoids congestion when transmitting a message from a sender computing device to a receiver computing device.

Advancing from step 704 to step 706, the method 700 may further include determining, by a congestion controller in communication with the load balancer, parameters for a message based on information received from the scheduler. As discussed above, the load balancer and the congestion controller may comprise a closed loop with positive feedback from the load balancer to the congestion controller. The information received from the scheduler may include at least one of a priority and packet loss awareness.

Continuing from step 706 to step 708, the method 700 may further include selecting, by the scheduler, a load balancing algorithm from a plurality of load balancing algorithms based on the parameters of the message received from the congestion controller. The plurality of load balancing algorithms may include an earliest completion first algorithm, a delayed decision making algorithm, and a most stable path algorithm.

The scheduler may also select a scheduling algorithm from a plurality of scheduling algorithms. The plurality of scheduling algorithms may include a round robin algorithm, a weighted round robin algorithm, a minimum message size algorithm, a least packet lost algorithm, a minimum round trip time algorithm, and a minimum smoothed round trip time algorithm.

A path monitor may select a congestion control algorithm for each path of the plurality of paths from a plurality of congestion control algorithms based on path information. The path information may include a number of in-flight messages, a total remaining size of messaged waiting to be transferred, an average round trip time, a most recent round trip time, a shortest round trip time, an average sending rate without congestion, a most recent sending rate without congestion, a congestion notification, and a packet loss rate. The congestion control algorithms may determine a path status for each respective path based on the path information.

Proceeding from step 708 to step 710, the method 700 may further include determining, by the scheduler, a timing and a path of the plurality of paths for the message to be sent to the transport layer based on the selected load balancing algorithm.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
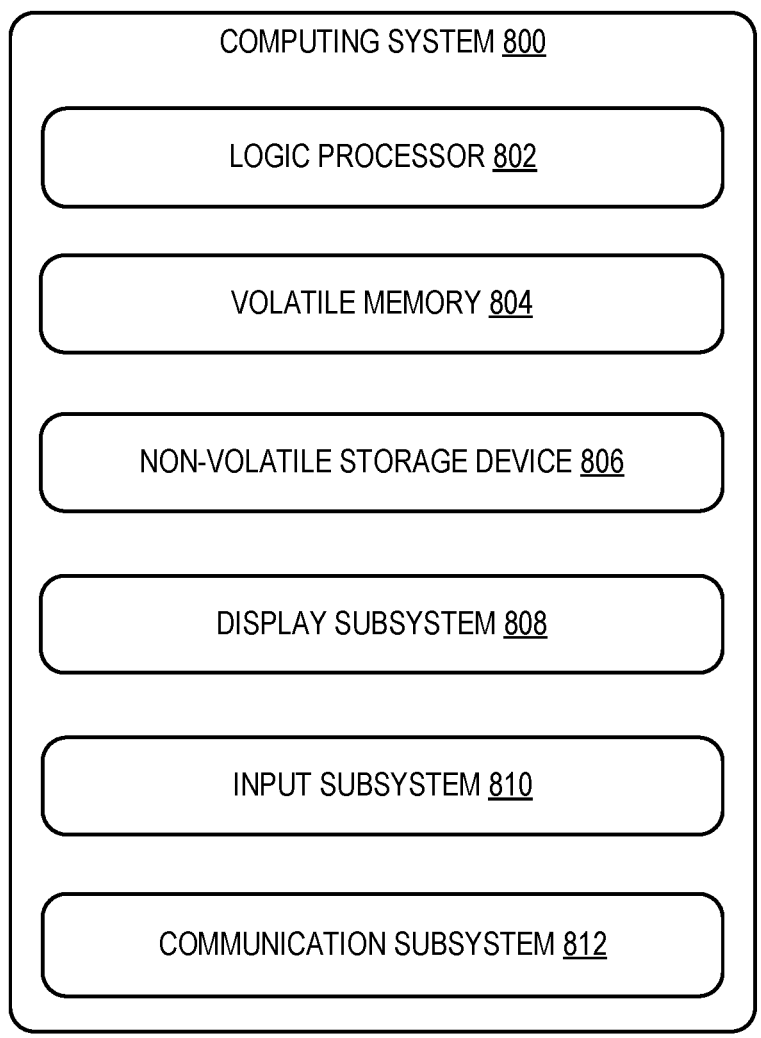
FIG. 8 shows a schematic view of an example computing environment in which the computing system of FIG. 1 may be enacted.

FIG. 8 schematically shows a non-limiting embodiment of a computing system 800 that can enact one or more of the methods and processes described above. Computing system 800 is shown in simplified form. Computing system 800 may embody the computer device 10 described above and illustrated in FIG. 1. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 800 includes a logic processor 802 volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via logic processor 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, touch pad, camera, or microphone.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The following paragraphs provide additional description of aspects of the present disclosure. One aspect provides a computing system for flexible load balancing on a multipath network. The computing system may comprise a processor, a load balancer, and a congestion controller. The processor may execute instructions using portions of associated memory to implement a multipath transport protocol. The multipath transport protocol may be implemented as a transport layer on top of a user datagram protocol layer of a network stack. The load balancer may distribute network traffic across a plurality of paths. The load balancer may include a scheduler. The congestion controller may be in communication with the load balancer, and the congestion controller may be configured to determine parameters for a message based on information received from the scheduler. The scheduler may select a load balancing algorithm from a plurality of load balancing algorithms based on the parameters of the message received from the congestion controller. Based on the selected load balancing algorithm, the scheduler may determine a timing and a path of the plurality of paths for the message to be sent to the transport layer.

In this aspect, additionally or alternatively, the load balancer and the congestion controller may comprise a closed loop with positive feedback from the load balancer to the congestion controller.

In this aspect, additionally or alternatively, the plurality of load balancing algorithms may include an earliest completion first algorithm, a delayed decision making algorithm, and a most stable path algorithm.

In this aspect, additionally or alternatively, the information may include at least one of priority and packet loss awareness.

In this aspect, additionally or alternatively, the scheduler may be further configured to select a scheduling algorithm from a plurality of scheduling algorithms.

In this aspect, additionally or alternatively, the plurality of scheduling algorithms may include a round robin algorithm, a weighted round robin algorithm, a minimum message size algorithm, a least packet lost algorithm, a minimum round trip time algorithm, and a minimum smoothed round trip time algorithm.

In this aspect, additionally or alternatively, the system may further comprise a path monitor. The path monitor may be configured to receive path information. The path information may include a number of in-flight messages, a total remaining size of messaged waiting to be transferred, an average round trip time, a most recent round trip time, a shortest round trip time, an average sending rate without congestion, a most recent sending rate without congestion, a congestion notification, and a packet loss rate.

In this aspect, additionally or alternatively, the path monitor may be further configured to select a congestion control algorithm for each path of the plurality of paths from a plurality of congestion control algorithms based on the path information.

In this aspect, additionally or alternatively, the selected congestion control algorithms may determine a path status for each respective path based on the path information. The selected load balancing algorithm may determine if a message will be sent to the transport layer, and when the message is sent.

In this aspect, additionally or alternatively, when the processor receives an acknowledgement for receipt of a sent message, the congestion controller may be configured to increase a congestion window size by 1/n, with n being the number of paths.

Another aspect provides a method for flexible load balancing on a multipath network. The method may comprise implementing a multipath transport protocol as a transport layer on top of a user datagram protocol layer of a network stack; distributing, by a load balancer including a scheduler, network traffic across a plurality of paths; determining, by a congestion controller in communication with the load balancer, parameters for a message based on information received from the scheduler; selecting, by the scheduler, a load balancing algorithm from a plurality of load balancing algorithms based on the parameters of the message received from the congestion controller; and determining, by the scheduler, a timing and a path of the plurality of paths for the message to be sent to the transport layer based on the selected load balancing algorithm.

In this aspect, additionally or alternatively, the load balancer and the congestion controller may comprise a closed loop with positive feedback from the load balancer to the congestion controller.

In this aspect, additionally or alternatively, the plurality of load balancing algorithms may include an earliest completion first algorithm, a delayed decision making algorithm, and a most stable path algorithm.

In this aspect, additionally or alternatively, the method may further comprise including in the information at least one of a priority and packet loss awareness.

In this aspect, additionally or alternatively, the method may further comprise selecting, by the scheduler, a scheduling algorithm from a plurality of scheduling algorithms.

In this aspect, additionally or alternatively, the plurality of scheduling algorithms may include a round robin algorithm, a weighted round robin algorithm, a minimum message size algorithm, a least packet lost algorithm, a minimum round trip time algorithm, and a minimum smoothed round trip time algorithm.

In this aspect, additionally or alternatively, the method may further comprise receiving, by a path monitor, path information including a number of in-flight messages, a total remaining size of messaged waiting to be transferred, an average round trip time, a most recent round trip time, a shortest round trip time, an average sending rate without congestion, a most recent sending rate without congestion, a congestion notification, and a packet loss rate.

In this aspect, additionally or alternatively, the method may further comprise selecting, by the path monitor, a congestion control algorithm for each path of the plurality of paths from a plurality of congestion control algorithms based on the path information.

In this aspect, additionally or alternatively, the method may further comprise determining, by the selected congestion control algorithms, a path status for each respective path based on the path information.

Another aspect provides a computing system for flexible load balancing on a multipath network. The computing system may comprise a processor, a load balancer, a congestion controller, and a path monitor. The processor may execute instructions using portions of associated memory to implement a multipath transport protocol. The multipath transport protocol may be implemented as a transport layer on top of a user datagram protocol layer of a network stack. The load balancer may distribute network traffic across a plurality of paths. The load balancer may include a scheduler. The congestion controller may be in communication with the load balancer, and the congestion controller may be configured to determine parameters for a message based on information received from the scheduler. The path monitor may be configured to receive path information. The load balancer and the congestion controller may comprise a closed loop with positive feedback from the load balancer to the congestion controller. The scheduler may select a load balancing algorithm from a plurality of load balancing algorithms based on the parameters of the message received from the congestion controller. The path monitor may select a congestion control algorithm for each path of the plurality of paths from a plurality of congestion control algorithms based on the path information. A timing and a path of the plurality of paths for the message to be sent to the transport layer may be determined based on the selected load balancing algorithm and the selected congestion control algorithm.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for flexible load balancing on a multipath network, comprising:
a processor that executes instructions using portions of associated memory to implement:
a multipath transport protocol, the multipath transport protocol being implemented as a transport layer on top of a user datagram protocol layer of a network stack;
a load balancer that distributes network traffic across a plurality of paths, the load balancer including a scheduler; and
a congestion controller in communication with the load balancer, the congestion controller being configured to determine parameters for a message to be sent based on information received from the scheduler, wherein
the scheduler selects a load balancing algorithm from a plurality of load balancing algorithms based on the parameters of the message received from the congestion controller,
based on the selected load balancing algorithm, the scheduler determines a timing and a path of the plurality of paths for the message to be sent to the transport layer, and
communication between the load balancer and the congestion controller to determine the timing and the path for the message to be sent comprises a closed loop with positive feedback from the load balancer to the congestion controller.

2. The computing system of claim 1, wherein
the plurality of load balancing algorithms includes an earliest completion first algorithm, a delayed decision making algorithm, and a most stable path algorithm.

3. The computing system of claim 1, wherein
the information includes at least one of priority and packet loss awareness.

4. The computing system of claim 1, wherein
the scheduler is further configured to select a scheduling algorithm from a plurality of scheduling algorithms.

5. The computing system of claim 4, wherein
the plurality of scheduling algorithms includes a round robin algorithm, a weighted round robin algorithm, a minimum message size algorithm, a least packet lost algorithm, a minimum round trip time algorithm, and a minimum smoothed round trip time algorithm.

6. The computing system of claim 1, the processor further implements:
a path monitor configured to receive path information, the path information including a number of in-flight messages, a total remaining size of messaged waiting to be transferred, an average round trip time, a most recent round trip time, a shortest round trip time, an average sending rate without congestion, a most recent sending rate without congestion, a congestion notification, and a packet loss rate.

7. The computing system of claim 6, wherein
the path monitor is further configured to select a congestion control algorithm for each path of the plurality of paths from a plurality of congestion control algorithms based on the path information.

8. The computing system of claim 7, wherein
the selected congestion control algorithms determine a path status for each respective path based on the path information, and
the selected load balancing algorithm determines if a message will be sent to the transport layer, and when the message is sent.

9. The computing system of claim 1, wherein
when the processor receives an acknowledgement for receipt of a sent message, the congestion controller is configured to increase a congestion window size by 1/n, with n being the number of paths.

10. A method for flexible load balancing on a multipath network, the method comprising:
implementing a multipath transport protocol as a transport layer on top of a user datagram protocol layer of a network stack;
distributing, by a load balancer including a scheduler, network traffic across a plurality of paths;
determining, by a congestion controller in communication with the load balancer, parameters for a message to be sent based on information received from the scheduler;
selecting, by the scheduler, a load balancing algorithm from a plurality of load balancing algorithms based on the parameters of the message received from the congestion controller; and
determining, by the scheduler, a timing and a path of the plurality of paths for the message to be sent to the transport layer based on the selected load balancing algorithm, wherein
communication between the load balancer and the congestion controller to determine the timing and the path for the message to be sent comprises a closed loop with positive feedback from the load balancer to the congestion controller.

11. The method of claim 10, wherein
the plurality of load balancing algorithms includes an earliest completion first algorithm, a delayed decision making algorithm, and a most stable path algorithm.

12. The method of claim 10, the method further comprising:
including in the information at least one of a priority and packet loss awareness.

13. The method of claim 10, the method further comprising:
selecting, by the scheduler, a scheduling algorithm from a plurality of scheduling algorithms.

14. The method of claim 13, wherein
the plurality of scheduling algorithms includes a round robin algorithm, a weighted round robin algorithm, a minimum message size algorithm, a least packet lost algorithm, a minimum round trip time algorithm, and a minimum smoothed round trip time algorithm.

15. The method of claim 10, the method further comprising:
receiving, by a path monitor, path information including a number of in-flight messages, a total remaining size of messaged waiting to be transferred, an average round trip time, a most recent round trip time, a shortest round trip time, an average sending rate without congestion, a most recent sending rate without congestion, a congestion notification, and a packet loss rate.

16. The method of claim 15, the method further comprising:
selecting, by the path monitor, a congestion control algorithm for each path of the plurality of paths from a plurality of congestion control algorithms based on the path information.

17. The method of claim 16, the method further comprising:
determining, by the selected congestion control algorithms, a path status for each respective path based on the path information.

18. A computing system for flexible load balancing on a multipath network, comprising:
a processor that executes instructions using portions of associated memory to implement;
a multipath transport protocol, the multipath transport protocol being implemented as a transport layer on top of a user datagram protocol layer of a network stack;
a load balancer that distributes network traffic across a plurality of paths, the load balancer including a scheduler;
a congestion controller in communication with the load balancer, the congestion controller being configured to determine parameters for a message to be sent based on information received from the scheduler; and
a path monitor configured to receive path information, wherein
the scheduler selects a load balancing algorithm from a plurality of load balancing algorithms based on the parameters of the message received from the congestion controller,
the path monitor selects a congestion control algorithm for each path of the plurality of paths from a plurality of congestion control algorithms based on the path information,
a timing and a path of the plurality of paths for the message to be sent to the transport layer is determined based on the selected load balancing algorithm and the selected congestion control algorithm, and
communication between the load balancer and the congestion controller to determine the timing and the path for the message to be sent comprises a closed loop with positive feedback from the load balancer to the congestion controller.

* * * * *